June 1, 1965

F. J. SMYTH 3,186,110

TRAINING APPARATUS

Filed March 26, 1963

INVENTOR
FREDERICK J. SMYTH

INVENTOR
FREDERICK J. SMYTH

INVENTOR
FREDERICK J. SMYTH

United States Patent Office 3,186,110
Patented June 1, 1965

3,186,110
TRAINING APPARATUS
Frederick J. Smyth, Binghamton, N.Y., assignor to General Precision, Inc., Binghamton, N.Y., a corporation of Delaware
Filed Mar. 26, 1963, Ser. No. 268,074
8 Claims. (Cl. 35—11)

This invention relates to a training apparatus and more particularly to an apparatus for training one or more operators of vehicles and for monitoring and recording the results of such training.

For the obvious reason that the operation of motor vehicles upon public thoroughfares is inherently dangerous, the advantages of providing a simulated vehicle training apparatus for initially training and testing inexperienced operators prior to the operator's undertaking the control of an actual vehicle, as well as for the retraining and retesting of experienced operators, are readily apparent.

Therefore, according to the prior art, there have been provided a large number of such simulated training apparatuses. In general, a large majority of the prior art apparatuses include one or more operator's positions furnished with dummy controls and indicating devices which simulate the controls and indicating devices of an actual vehicle. Realistic problems are then presented to the operator by means of a motion picture projector in combination with a projection screen positioned forward of the operator's position. The skill and reaction time of the operator in response to the various problems presented upon the screen is then mounted, indicated, and/or recorded.

In general, it is desirable that the reactions of all the operator-trainees be conveyed to and monitored, indicated and/or recorded, at a central location. This central location usually contains, as necessary, the motion picture projector, an auxiliary manually operated slide projector, indicating lights, and a recorder, and it is at this central location that an instructor can individually monitor each of the student's reactions to a specific problem.

There have been designed several schemes to achieve the above features, and, while they are readily attainable when only one, or a few, operator positions are provided, such installations become complex and relatively inefficient when a large number of operator positions are required, as a result of the enormous number of interconnecting cables coupling each operator's position to the central, or instructor's, location. An apparatus which provides the above features, yet significantly reduces the number of interconnecting cables necessary, is shown and described in copending application Serial No. 180,428, filed March 19, 1962 on behalf of Gene H. Sheridan and assigned to the assignee of this invention.

According to the present invention, however, there is provided an improved training apparatus which, while retaining all of the above features, reduces the number of interconnecting cables to a minimum. As will be described with respect to a first preferred embodiment of the invention, only a single conductor cable is required from the instructor's location to each operator's location, and further, only a single conductor cable is required from each operator's position back to the instructor's position. In operation, a signal is fed from the instructor's location to each operator's position indicative of the problem about to be presented to the student. At the operator's position, the signal is employed to monitor the student's operation of the controls necessary to correctly solve the problem. The result of the student's reactions is then returned to the instructor's location for recording. Simultaneously with the signals that are fed to the operator's position, a similar signal is also delivered to a recorder select unit at the instructor's location and is effective therein to channel the return signals from all of the operator's position to the proper recorder both as to operator's position number and as to the specific problem tested, all as more particularly hereinafter described.

It is an object of the invention, therefore, to provide an improved training apparatus.

Another object of the invention is to provide a training apparatus including a central recorder and a number of trainee locations wherein the quantity of interconnecting cables therebetween is reduced to a minimum.

Still another object of the invention is to provide an improved training apparatus including a central station and a plurality of trainee stations wherein an interrogation signal is sent from the central station to all of the trainee stations and the results of the interrogation signals applied to the trainee stations are returned to the central station and recorded.

The invention accordingly comprises the features of construction, combinations of elements, and arrangement of parts, which will exemplified in the constructions hereinafter set forth, and the scope of the invention will be indicated in the claims.

For a fuller understanding of the nature and objects of the invention reference should be had to the following detailed description taken in connection with the accompanying drawings, in which.

In the detailed description to follow, it should be understood that a preferred embodiment of the invention is illustrated as including one or more operator-trainee positions each equipped with a number of simulated control devices for operation by the student. Further, a projector is provided to display upon a screen, a sequence of scenes to present to the trainees a series of problems or tests, the reaction of the trainee thereto being determined by monitoring, indicating, and/or recording the trainee's operation of the simulated control devices in accordance with the specific problems presented. Although the present invention may additionally be utilized in conjunction with more complicated training apparatuses such as those which include a projection television system wherein the television camera is positioned adjacent a simulated highway scene in response to the trainee's operation of the simulated controls, as an aid in understanding the broad features of the present invention a preferred embodiment thereof will first be described in detail as an improvement of the hereinabove referenced copending application, and various extensions therefrom will in part be obvious and in part briefly explained.

Figure 1:
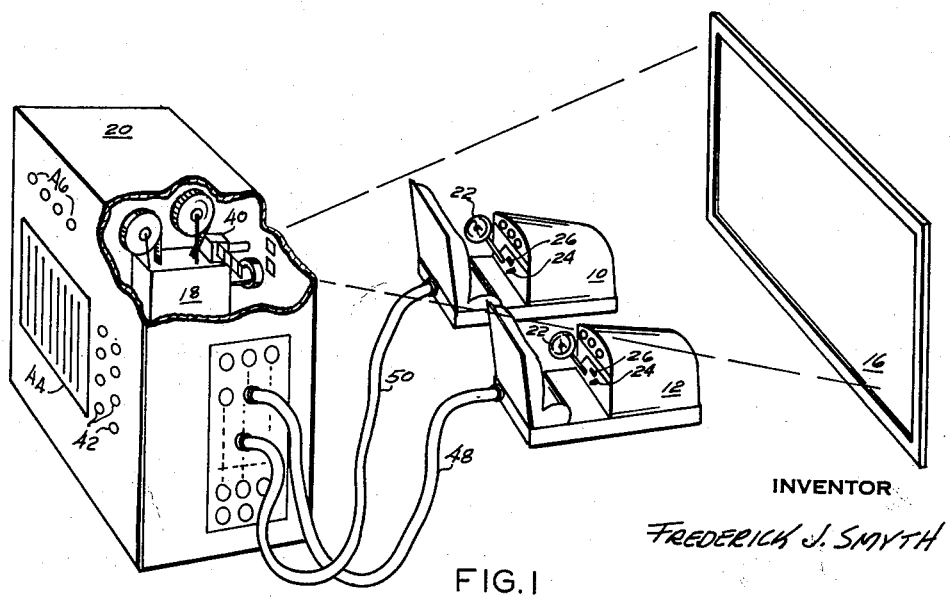
FIG. 1 is a pictorial view illustrating the general arrangement of a preferred embodiment of the training apparatus of the invention.

Referring now to the drawings, there is illustrated in FIG. 1 the general arrangement of the apparatus of the invention. As there shown, the apparatus includes one or more student trainee positions, generally indicated as 10 and 12, it being understood that only one, or a greater number of such positions, may be employed as desired, and, for economical reasons, a number of positions, such as twenty, are generally provided in a single installation. A screen 16 is located forward of all the trainee positions to display problems and tests during the simulated operation of each trainee's vehicle. The scenes are displayed on screen 16 by means of a projector 18 housed in an upper portion of an instructor's location 20.

Since the actual apparatus and its method of operation forms no part of the present invention, it hereinafter being shown that the apparatus is readily adaptable to any driver training apparatus, no detailed description thereof is included in this specification. However, a brief summary of the operation of the training apparatus of the above-referenced copending application Serial No. 180,-428 will next be described as an aid in understanding the first preferred embodiment of the present invention, resort being made to the copending application for specific details.

As therein disclosed, the apparatus includes a unique D.C. analog simulation of an automobile engine-transmission-speedometer system using RC circuits without operational amplifiers. A motion picture projector presents a program and sequence of trip scenes to the student, and digital data coded on the film sound track operates monitoring equipment to check whether the various student operated controls are properly positioned at various instants, and student errors are indicated. Serial 5-bit digital pulse trains are recorded on the film sound track. They are read and fed into a shift register to provide a parallel binary number, which is decoded to energize a conductor associated with a given control condition to be monitored. In the specific embodiment shown therein, nineteen different and separate operating conditions of the simulated car are sensed to determine whether or not the student action is correct, and hence nineteen different binary numbers are coded on films to be used with the device, for the purpose of indicating which operating condition should be checked. Since the binary decoding matrix employed, which may be of the class described in Arithmetic Operations in Digital Computers by R. K. Richards, published in 1955 by D. Van Nostrand Company, Inc., at pages 71 et seq., allows up to 32 tests to be made, more or less than 19 may be utilized when a given binary number is encoded on the film and used by the apparatus, and a selected output wire of the matrix is energized. By way of example, the binary number "five" may be coded on the film with a scene or sequence which demands that the student steer full to the right. Upon decoding the binary number, the matrix energizes its number five output conductor, thereby directing a voltage to an error indicating device. However, if the student is steering full to the right at the time the number five output conductor is energized, a switch electrically connected in series with the number five conductor is opened, thereby preventing energization of the error indicating device. Alternatively, if the student is steering in any other direction, the switch remains closed, and the error indicating device is energized. Complete details are, of course, to be found in the copending application.

Referring again now to FIG. 1, apparatus similar to that above described is illustrated in general form. Each of the student-trainee positions is equipped with a number of simulated controls such as a steering wheel 22, an accelerator pedal 24, a brake pedal 26, a transmission shift lever 28, etc., as well as a number of simulated indicator devices such as a speedometer 30, a fuel gauge 32, a temperature gauge 34, etc. Operation of the simulated controls by the student results in the various simulated indicators responding thereto, as a result of the above mentioned simple RC analog computer associated with each student's position. By way of example, depression of the simulated acceleration pedal is effective to generate a voltage which, when applied to the simulated speedometer, results in a higher rate of speed being indicated. Conversely, depression of the simulated brake pedal is effective to decrease the magnitude of the generated voltage to thereby decrease the rate of speed being indicated by the simulated speedometer. Further, the operation of each control is sensed, by any convenient method such as potentiometers, stepping switches, and the like as will be understood by those skilled in the art, and an electrical signal representative of such operation is conveyed to instructor's location 20, as will be more fully understood as the description proceeds. Additionally, the binary information encoded on the film sound track is also conveyed to each of the trainee's position and to instructor's location 20 wherein it is decoded and effective to record operator errors, if the control and/or controls being tested are not properly positioned as stated above.

Thus far, the operation of the apparatus shown in FIG. 1 is essentially identical with that described in the above referenced copending application. The improvement of the present invention is primarily directed to recording at a central location the trainees reactions to the sequence of presented problems and tests and to minimizing the number of interconnected cables required to attain this feature.

Continuing now with FIG. 1, station 20 in addition to including movie projector 18 also contains an auxiliary slide projector 40, selectively controlled by the instructor through one or more control devices indicated generally as 42, which are operative to superimpose stationary scenes upon screen 16 in conjunction with the moving scenes provided by projector 18. As will be understood as the description proceeds, the operation of a control device 42 to activate slide projector 40 is also effective to generate a 5-bit digital code signal analogous to that encoded on the film within projector 18. Additionally, a multichannel recorder 44 and a bank of indicator lights 46 are located at station 20. Although only five lights are illustrated, corresponding to the five indicator lights of a single operator's station described in the above-referenced copending application, it should be realized that a group of five or more indicator lights may be installed for each trainee's position at station 20. Finally, there is shown in FIG. 1 the necessary interconnecting cables, such as 48 and 50, linked between station 20 and operator's positions 10 and 12, it being understood that at most only a single conductor cable is required between station 20 and each trainee's position as well as a single conductor cable from each trainee's position returning to station 20.

Figure 2:
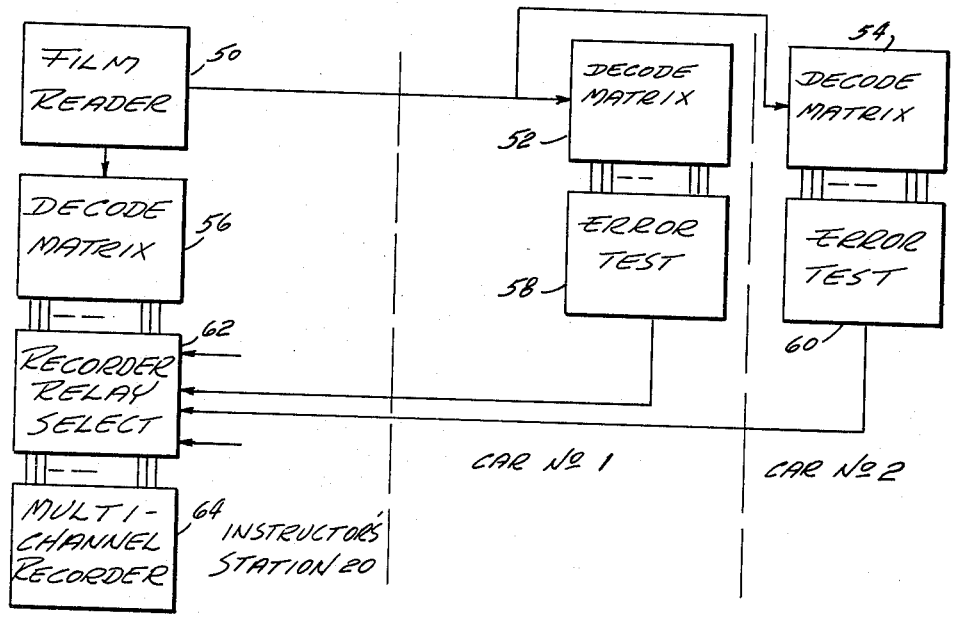
FIG. 2 is a block diagram illustrating the electrical circuits employed for recording in a preferred embodiment of the invention.

Referring now to FIG. 2, there is indicated in block diagram form, the electrical circuitry employed in reading the student-trainee's reactions to the realistic problems displayed upon screen 16. As there shown, a film reader 50 is effective to transcribe the information encoded on the motion picture film into electrical signals corresponding thereto. The decoded signal is fed not only to a decode matrix, such as 52 and 54, in each trainee's position but also to a further decode matrix 56 at instructor station 20, the actual matrix being more fully described in the above referenced copending application. For each unique digital signal, a particular output line of the matrix is energized, and the student's reactions to the particular problem displayed upon screen 16 is monitored by error test units, such as 58 and 60, to be hereinafter described. A signal from units 58 and 60, representative of the student's reactions, is then delivered to a recorder relay select unit 62, which under control of matrix 56, is operative to channel each of the signals from the operator positions to the proper location on a multichannel recorder 64.

Figure 3:
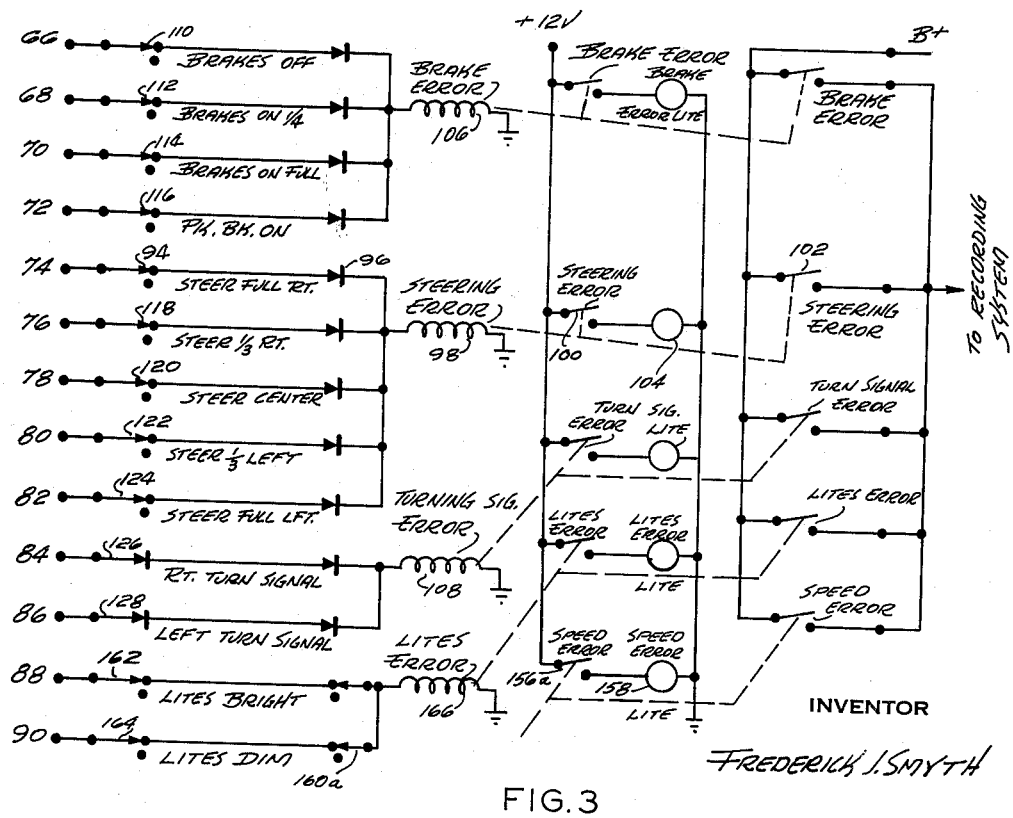
FIG. 3 is an electrical schematic diagram of a portion the error test unit shown in FIG. 2.

Referring now to FIG. 3, there is illustrated a portion of the error test circuitry of the above-referenced copending application as modified by the present invention. As there shown, 13 input lines 66 through 90 are coupled to the individual output lines of a decode matrix such as 52. When a given binary number is encoded on the film and read by film reader 50, an electrical signal representative of such number is fed to all of the decode matrices, and a selected output line of each of the matrices is energized. For example, the binary number five may be encoded on the film with a scene or sequence which demands that the student steer full to the right. Upon decoding the binary number, a matrix, such as 52, will energize its output conductor No. 5, thereby applying a voltage to line 74. If the student is steering full to the right at the time line 74 is energized, switch 94 is open and no signal is fed through diode 96 to energize relay 98. If, however, the student is not steering full to the right at the time line 74 is energized, switch 94 is closed, and an error signal is applied through diode 96 thereby energizing steering error relay 98. Energization of relay 98 is effective to close the associated contacts 100 and 102, the first of which operates to illuminate a local steering error relay light 104 and the second of which imparts an error signal to instructor's station 20. Switch 94 is operated by the trainer steering wheel and is closed for all steering positions except full right. It should be noted that, in this preferred embodiment, only errors are sensed and indicated and recorded, rather than the control positions and conditions themselves, which results in no output indication if the student performs perfectly. Additional output conductors from a decode matrix are also illustrated in FIG. 3, connected through respective switches, which may be switch or relay operated, to energize either a braking error relay 106, steering error relay 98, or a turn signal error relay 108. Switches 110, 112 and 114 are operated by the brake pedal, and switch 116 is operated by the hand brake. Switches 94 and 118 through 124 are operated by the steering wheel and switches 126 and 128 are operated by the turn signal control.

Since monitoring of the student's simulated speed is relatively important, there is incorporated circuitry for detecting speed errors. By coding a binary number from 14 through 19 on the film by way of example, the associated output conductor of a decode matrix is energized, thereby energizing a respective relay of the group 130 through 140 (see FIG. 4). The energization of one of relays 130 through 140 is effective to activate a "speed test enable" line 142 by closing one of contacts 130a through 140a. Closure of one of contacts 130b through 140b connects a selected voltage from a voltage divider via a complementary pair of transistor followers 144 and 146 to the emitter of a transistor 148, the base of which is connected via a resistor 150 and a line 152 to the voltage simulating the car velocity. When the simulated automobile velocity does not exceed the instantaneous maximum permissible velocity, the voltage applied to the emitter of transistor 148 exceeds the voltage applied to the base thereof, thereby cutting off transistors 148 and 154. However, when the student is driving at a simulated velocity greater than that permitted, transistors 148 and 154 conduct, and a speed error relay 156 is energized, illuminating a speed error indicating light 158 through contact 156a (see FIG. 3).

Figure 4:
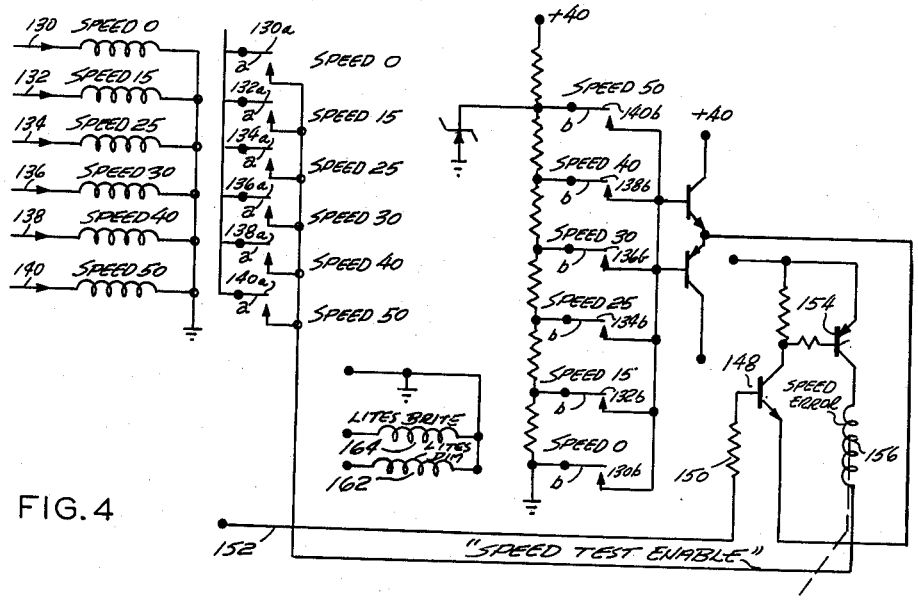
FIG. 4 is an electrical schematic diagram of a further portion of the error test unit shown in FIG. 2.

A foot-operated headlight dimmer switch is connected to the power source through a headlight switch and is effective to energize a "dim" and a "bright" relay 160 and 162 (see FIG. 4). If binary number 13 is coded on the motion picture film, line 90 is energized by a decode matrix, and a signal is applied via a diode 164 and contact 160a of relay 160 to energize a light error relay 166 unless the student has properly dimmed the headlights by his operation of the headlight dimmer switch. Relay 162 is arranged analogously to indicate intervals when the student may erroneously neglect to switch the simulated headlights to bright. It should be noted, and this is an outstanding feature of the present invention, that the recorder contacts of all of the error relays are connected in common and only a single conductor output cable, by way of example 48, is required to convey the error indications from the operator's position to the control location.

Figure 5:
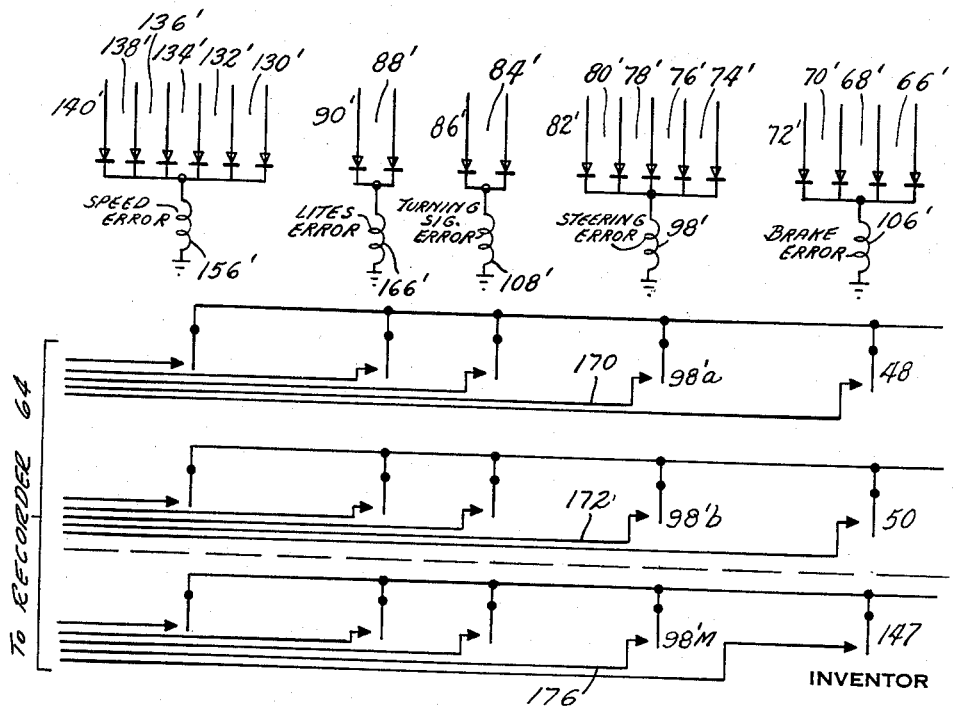
FIG. 5 is an electrical schematic diagram of the recorder relay selector shown in FIG. 2.

Referring now to FIG. 5, there is illustrated the novel manner by which the error indications from each operator's position is properly channeled by recorder relay select unit 62 to properly register on multi-channel recorder 64. As shown in FIG. 5, the output from decode matrix 56 is effective to energize a unique input line of unit 62, and, in order to emphasize the similarity between the circuitry of FIG. 5 and the above-described circuitry shown in FIGS. 3 and 4, corresponding reference numerals, with the addition of primes, are employed wherever possible. Continuing now with the example described above, when a steer full right test is in progress, line 74' is energized thereby picking steering error relay 98' and closing the contacts associated therewith, namely, 98'a, 98'b and 98'm. Now should the trainee in car number one not be steering full to the right, the error signal delivered along line 48 is coupled through closed contact 98'a and channeled along a line 170 to the proper position on recorder 64 to record the fact that the student in car number one made a steering error on the specific problem presented. In similar fashion, the error signal from car number two present on line 50 is coupled through closed contact 98'b and channeled along a line 172 to recorder 64, and the error signal from car number twenty appearing on a line 174, is coupled through closed contact 98'm and channeled to recorder 64 by means of a line 176. It can thus be readily seen that, for each and every test, the errors or absence thereof are simultaneously recorded for each of the operator's positions.

Figure 6:
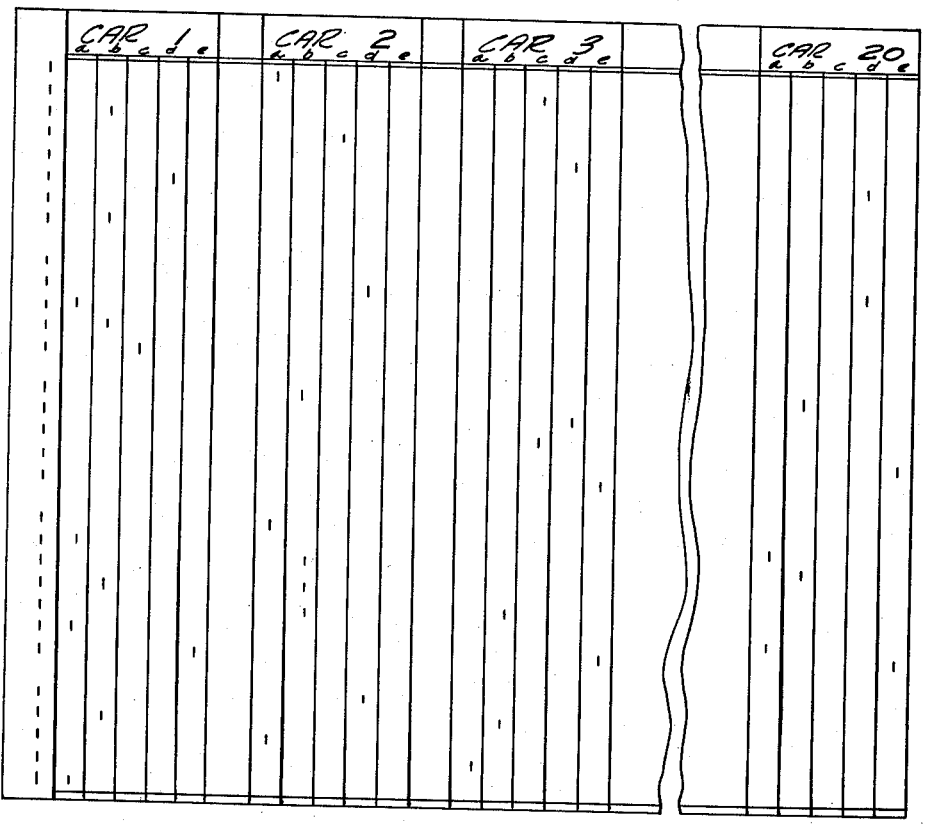
FIG. 6 is a fragmentary plan view of a record produced by a preferred embodiment of the apparatus of the invention.

FIG. 6 illustrates one of the many possible printed records provided by recorder 64. As there shown, each operator's position is separately identified, and, further, each test result from each operator's position is also separately recorded. Thus A indicates a brake test, B indicates a steering test, etc. Note should be made of the fact, and this is another important feature of the invention, that it is not necessary that the chart paper speed be synchronized with the motion picture film. Rather, timing pulses are recorded in the extreme left hand column of the chart in such manner that each timing pulse corresponds to a specific test. This is further emphasized by the spaces which randomly appear between several blocks of tests which result, by way of example, from the instructor momentarily stopping projector 18 in order to orally discuss the testing and training program.

From the above detailed description of a preferred embodiment of the present invention, various extensions thereof should now be obvious. By way of example, the above embodiment lumps together a number of related tests in parallel, and provides only a single error indication whenever an error is made during any of the related tests. As shown in FIGS. 3 and 4, four related brake tests provide a single brake error indication, five related steering tests provide a single steering error indication, six related speed tests provide a single speed error indication, etc. According to the present invention, however, it is feasible to provide separate commonly connected error relays for each individual test, since only a single conductor cable is required to convey to central location 20 the result of the test, with recorder relay select unit 62 thereafter being effective to channel the test results to the proper position on recorder 64 all as above described.

Further, although the invention has been described as an improvement of the training apparatus of the referenced copending application, it also is readily adaptable for use with any of the training apparatuses of the prior art, even though digital data is not encoded upon the motion picture film employed therein. This is accomplished by employing manual control at the instructor's location. Thus, when a test is about to be presented upon the projector seven, depression of the proper control by the instructor, is effective to direct a digital signal representative of the test to all of the operator's positions, in a manner analogous to that hereinbefore described.

What has been described is an improved driver training apparatus wherein the number of interconnecting cables required for efficient operation is reduced to a minimum with only a single cable employed to convey information from a central location to each operator's position, and another single cable employed to convey information from each operator's position to the central location.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A training apparatus comprising,
    (a) a trainee's position including a plurality of controls and indicating devices simulating those of an actual vehicle;
    (b) a projection screen;
    (c) means positioning said screen forward of said trainee's position;
    (d) a central station including means for projecting scenes stored on motion picture film onto said screen and a multi-channel recorder;
    (e) a first single electrical conductor and a second single electrical conductor;
    (f) means coupling said first and second conductors between said central station and said trainee's position;
    (g) first means for generating and coupling to said first conductor a sequence of interrogation signals effective to monitor the operation of selected ones of said controls and indicating devices;
    (h) second means for generating and coupling to said second conductor electrical signals indicative of said monitoring operation; and
    (i) said central station including further means responsive to said interrogation signals for selectively conveying each of said electrical signals to a predetermined channel of said multi-channel recorder.

2. The apparatus of claim 1 wherein said first generating means are manually controlled.

3. The apparatus of claim 1 wherein said sequence of interrogation signals is stored on said motion picture film.

4. The apparatus of claim 1 wherein said trainee's position further includes,
    (a) decoding means coupled to said first single electrical conductor and including a plurality of output lines;
    (b) a plurality of relays each including at least one normally open contact;
    (c) a plurality of control-operated switches each including first and second terminals;
    (d) first means connecting said first terminal of each of said switches in series with one of said relays and said second terminal of each of said switches in series with one of said output lines; and
    (e) second means connecting all of said at least one normally open contacts to said second single electrical conductor.

5. A training apparatus comprising,
    (a) a trainee's position including a plurality of controls and indicating devices simulating those of an actual vehicle;
    (b) a projection screen;
    (c) means positioning said screen forward of said trainee's position;
    (d) a central station including a motion picture film having a plurality of visual scenes stored thereon together with encoded digital signals associated with selected ones of said scenes and means for projecting scenes stored on motion picture film onto said screen and a multi-channel recorder;
    (e) first and second single electrical conductors;
    (f) means coupling said first and second single conductors between said central station and said trainee's position;
    (g) first means for generating and coupling to said first conductor a digital signal representative of each test problem displayed upon said screen;
    (h) said trainee's position further including second means responsive to said digital signal for generating and coupling to said second conductor an electrical signal only when certain ones of said controls selected by said digital signal are improperly operated in response to said test problem; and
    (i) said control station including further means responsive to said digital signal for conveying said electrical signal to a predetermined channel of said multi-channel recorder.

6. A training apparatus comprising,
    (a) a plurality of student positions each including a plurality of controls and indicating devices simulating those of an actual vehicle;
    (b) a projection screen and a motion picture film having a plurality of scenes and predetermined binary data stored on said film;
    (c) means positioning said screen forward of all of said plurality of student positions;
    (d) means for projecting scenes stored on said motion picture film onto said screen;
    (e) means responsive to said predetermined binary data stored on said film for generating at each student position an electrical representation indicative of predetermined operation of certain ones of said controls selected by said data;
    (f) a multi-channel recorder;
    (g) single conductor means connected between each of said student positions and said recorder for coupling said representations to said recorder; and
    (h) said recorder further including means responsive to said binary data for coupling each of said representations to a unique channel of said multi-channel recorder.

7. A training apparatus comprising,
    (a) a trainee's position including a plurality of controls and indicating devices simulating those of an actual vehicle, and a decode matrix and an error test unit;
    (b) a projection screen;
    (c) means positioning said screen forward of said trainee's position;
    (d) a central station including a motion picture film having a plurality of visual scenes stored thereon together with encoded digital data associated with selected ones of said scenes, a film reader operable to convert said digital data into electrical signals corresponding thereto, a further decode matrix, a recorder relay select unit, a multi-channel recorder, and means for projecting said scenes stored on said motion picture film onto said projection screen;
    (e) means coupling said electrical signals provided by said film reader to the input of said further decode matrix, the outputs of said further decode matrix to a first plurality of inputs of said recorder relay select unit, and the outputs of said recorder relay select unit to the channels of said multi-channel recorder;
    (f) a first one and only one electrical conductor;
    (g) means connecting said first one and only one electrical conductor between the output of said film reader and said decode matrix included in said trainee's position;
    (h) a second one and only one electrical conductor; and (i) means connecting said second one and only one electrical connector between the output of said error test unit and a further input of said recorder relay select unit.

8. The training apparatus of claim 7 wherein said recorder relay select unit is responsive to the output of said further decode matrix to couple said second one and only one electrical conductor to a predetermined one of said channels of said multi-channel recorder.

References Cited by the Examiner

UNITED STATES PATENTS

| | | | |
|---|---|---|---|
| 2,783,454 | 2/57 | North. | |
| 2,906,819 | 9/59 | Smith | 178—17 |
| 3,108,384 | 10/63 | Jazbutis et al. | 35—11 |

JEROME SCHNALL, *Primary Examiner.*

LAWRENCE CHARLES, *Examiner.*